US008359411B2

(12) United States Patent
Millet et al.

(10) Patent No.: US 8,359,411 B2
(45) Date of Patent: Jan. 22, 2013

(54) DATA FILTERING USING CENTRAL DMA MECHANISM

(75) Inventors: Timothy J. Millet, Mountain View, CA (US); David G. Conroy, El Granada, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/351,111

(22) Filed: Jan. 16, 2012

(65) Prior Publication Data

US 2012/0117282 A1 May 10, 2012

Related U.S. Application Data

(63) Continuation of application No. 12/319,940, filed on Jan. 14, 2009, now Pat. No. 8,099,528.

(60) Provisional application No. 61/101,639, filed on Sep. 30, 2008.

(51) Int. Cl.
*G06F 13/28* (2006.01)
*G06F 15/167* (2006.01)

(52) U.S. Cl. .......................................... 710/22; 709/212

(58) Field of Classification Search .................. None
See application file for complete search history.

(56) References Cited

U.S. PATENT DOCUMENTS

| 5,737,638 | A | 4/1998 | Byrn et al. |
| 6,202,106 | B1 | 3/2001 | Baxter |
| 6,724,759 | B1 | 4/2004 | Chang et al. |
| 6,983,382 | B1 | 1/2006 | Hartke et al. |
| 7,627,693 | B2 * | 12/2009 | Pandya ........................ 709/250 |
| 2009/0248910 | A1 | 10/2009 | Conroy et al. |

FOREIGN PATENT DOCUMENTS

EP 0473102 A 3/1992

* cited by examiner

*Primary Examiner* — Alan Chen
(74) *Attorney, Agent, or Firm* — Fletcher Yoder PC (57) ABSTRACT

A method and system is disclosed for passing data processed by a DMA controller through a transmission filter. The method includes the DMA controller accessing data for transfer between an origination location in the system and a destination location in the system. The accessed data is passed through the DMA controller before being sent to the destination location. While the data is being passed through the DMA controller, it is passed through a transmission filter for processing. This processing may include the addition or removal of transmission protocol headers and footers, and determination of the destination of the data. This processing may also include hash-based packet classification and checksum generation and checking. Upon completion of the processing, the data is sent directly to a prescribed destination location, typically either a memory circuit or an I/O device.

19 Claims, 5 Drawing Sheets

FIG. 5 though many additional features exist. Furthermore, embodiments of the present disclosure may relate to circuits used to interface with low-power device interfaces.

DATA FILTERING USING CENTRAL DMA MECHANISM

CROSS REFERENCE TO RELATED APPLICATIONS

The present application is a Divisional Application of U.S. patent application Ser. No. 12/319,940 filed on Jan. 14, 2009, which claims the benefit of U.S. Provisional Application No. 61/101,639, filed Sep. 30, 2008.

BACKGROUND

The present disclosure relates generally to filtering of data during a direct memory access transfer.

DESCRIPTION OF THE RELATED ART

This section is intended to introduce the reader to various aspects of art that may be related to various aspects that are described and/or claimed below. This discussion is believed to be helpful in providing the reader with background information to facilitate a better understanding of these various aspects. Accordingly, it should be understood that these statements are to be read in this light, and not as admissions of prior art.

A central processing unit (CPU) utilizes a list of commands, or instructions, to operate. These instructions are often grouped together as a program. Programs are typically stored in long term storage devices, such as a hard disk drive or non-volatile memory. Accessing these long term storage devices requires a certain amount of time, during which time the CPU must idly wait.

One manner in which to increase the efficiency while the CPU is waiting is to utilize a Direct Memory Access (DMA) controller. The DMA controller allows for data transfer in an electronic device without burdening the CPU. This may occur by a CPU handing off the fetching of a list of instructions that are grouped together as a program to a DMA controller, leaving the CPU free to execute previously fetched instructions while the DMA controller fetches the program for the CPU. Additionally, the CPU may hand off to the DMA controller a transfer of data from one sub-circuit to another or from the CPU to a sub-circuit.

The aforementioned data transfers by the DMA controller between a data source and a data receiver may be accomplished along a DMA channel. A DMA channel is a path between the DMA controller and a device. The DMA channel typically passes data, command signals, and a clock signal to the device. For example, a DMA controller may use the DMA channels to transfer data between a location in memory and an I/O device or between an I/O device and a location in memory. Similarly, a DMA controller may use DMA channels to transfer data between two locations in memory or directly between I/O devices.

One such I/O device may be a network interface device. A network interface device may allow an electronic device to be connected to a network either physically or wirelessly. Networks move streams of data with a fairly complex structure, and although it is possible to design a system to deal with this complex structure using a very simple network interface device and complex software running on a CPU, this design is impractical when the data rates are high and/or when it is necessary to operate at the lowest possible power, because dealing with the data's complex structure is not a task for which CPUs are ideally suited. As such, there is a need for network processing circuitry that increases overall system performance when using conventional network interface devices by assisting the CPU with some of its network processing tasks.

SUMMARY

Certain aspects of embodiments disclosed herein by way of example are summarized below. It should be understood that these aspects are presented merely to provide the reader with a brief summary of certain embodiments and that these aspects are not intended to limit the scope of the claims. Indeed, the disclosure and claims may encompass a variety of aspects that may not be set forth below.

An electronic device having a DMA controller is provided. In one embodiment, the DMA controller is connected to a DMA bus, through which a plurality of I/O devices and long term storage devices may be accessed. One such I/O device is a network interface circuit. The present disclosure includes techniques and circuitry for processing network packets received by the network interface circuit processing. This processing may occur in a DMA controller. The DMA controller includes an offload filter that may utilize network packet processing techniques to support classification, routing, and checking of network data packets. By utilizing an offload filter to process the network packets, the DMA controller can perform a portion of the processing of the network packets while it is transferring the data from the network interface circuit.

BRIEF DESCRIPTION OF THE DRAWINGS

Certain embodiments may be understood reading the following detailed description and upon reference to the drawings in which like characters represent like parts throughout the drawings, wherein.

DETAILED DESCRIPTION OF SPECIFIC EMBODIMENTS

One or more specific embodiments will be described below. In an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques and circuitry for network packet processing in a DMA controller. An offload filter located in the DMA controller may support classification, routing, and checking of network data packets.

By utilizing an offload filter to process the network packets, the DMA controller can perform a portion of the processing of the network packets while it is transferring the data associated with the packets. Furthermore, a scheduling mechanism may address DMA transfer conflicts. A discussion is presented below of an electronic device that utilizes a DMA controller for the processing of network packets.

Figure 1:
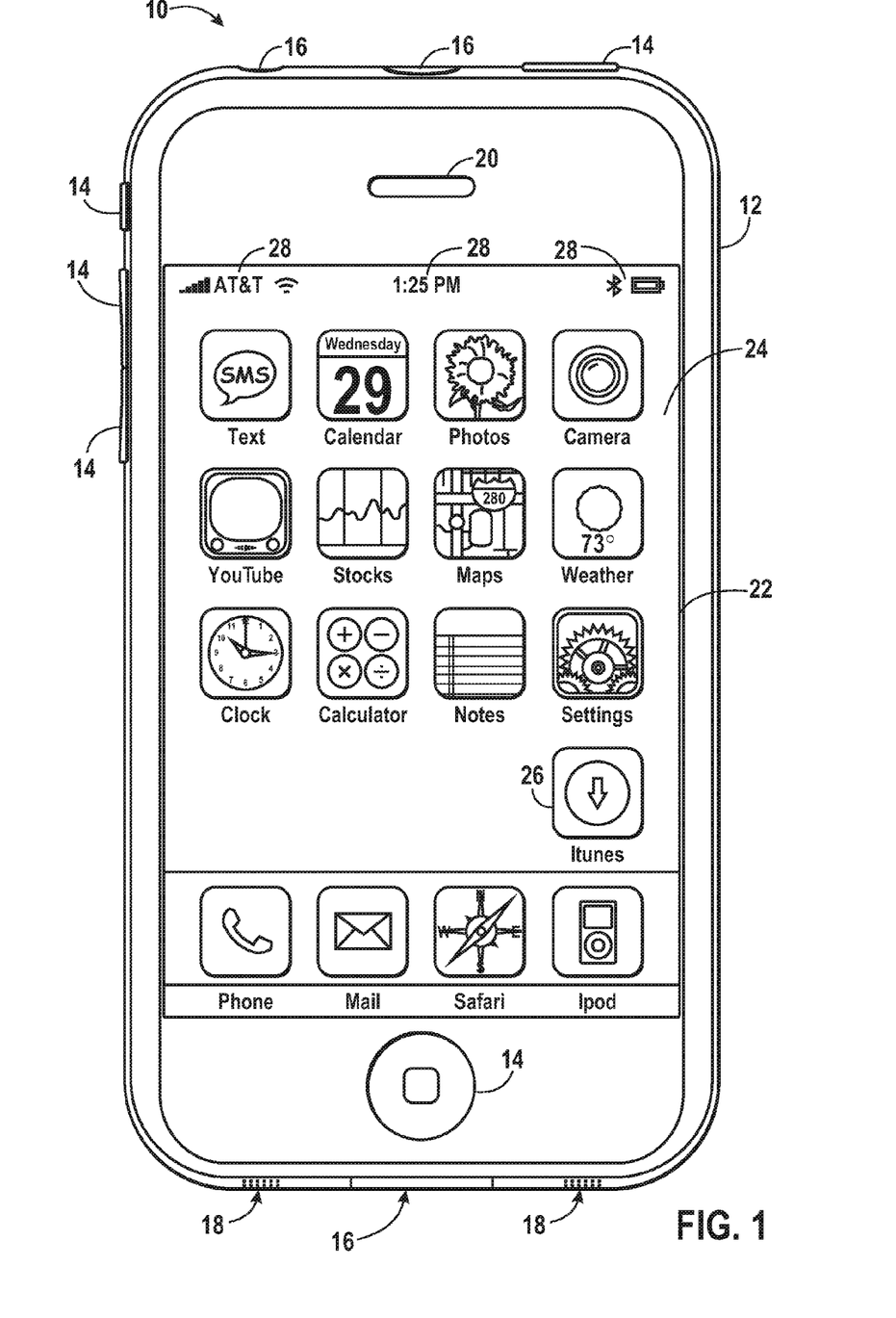
FIG. 1 is a first view of an electronic device, such as a portable media player, in accordance with one embodiment.

Turning now to the figures, FIG. 1 illustrates an electronic device 10 that may make use of a DMA controller for the processing of network packets as described above. It should be noted that while implementation of the DMA controller will be described below in reference to the illustrated electronic device 10 (which may be a media player for playing music and/or video, a cellular phone, a personal data organizer, or any combination thereof), the techniques and circuitry for voltage conversion described herein may be useable with any device including network capability and a DMA controller.

As noted above, illustrated electronic device 10 may be a device providing any one of or a combination of the functionality of a media player, a cellular phone, a personal data organizer, and so forth. In this manner, a user of the electronic device 10, depending on the functionalities provided by the electronic device 10, may listen to music, play games or video, record video or take pictures, place and take telephone calls, communicate with others, control other devices (e.g., the device 10 may include remote control and/or Bluetooth functionality, for example), and so forth while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. By way of example, the electronic device 10 may be a model of an iPod® having a display screen or an iPhone® available from Apple Inc.

In the depicted embodiment, the electronic device 10 includes an enclosure 12, user input structures 14, input and/or output ports 16, one or more input receivers 18, one or more output transmitters 20, and a display 22, as will be described below. The enclosure 12 may be formed from plastic, metal, composite materials, or other suitable materials or any combination thereof. The enclosure 12 may protect the interior components of the electronic device 10 from physical damage, and may also shield the interior components from external electro magnetic interference (EMI).

The user input structures 14 may be configured to control the device 10 by controlling a mode of operation, an output level, an output type, etc. For instance, the user input structures 14 may include a button to turn the device 10 on or off. This button may, for example, be located at the top of the enclosure 12. The user input structures 14 may also include a wheel that may be used to interface with a graphical user interface (GUI) 24 on display 22 and may be located on the lower portion of the electronic device 10 below the display 22. Additionally, the user input structures 14 may include, on a side of the enclosure 12, for example, buttons that correspond to volume controls to be used in conjunction with the output receiver 20 as well as a button that may be used to silence a telephone ringer. In general, the electronic device 10 may include any number of user input structures 14, including buttons, switches, keys, knobs, or any other suitable input structures.

The input and/or output ports 16 may allow connection of the electronic device 10 to external devices. For example, the port 16 at the top of the enclosure 12 may be a headphone jack that provides for connection of audio headphones. A second port 16 at the top of the enclosure 12 may be a subscriber identity module (SIM) card slot. A further port 16 may be located at the bottom of the enclosure 12 and may be a connection port by the manufacturer of the electronic device 10 for transmitting and receiving data files, such as media files. Other ports 16 for connection of headset jacks, AC and/or DC power connectors, or other input/output ports 16 are additionally contemplated.

The electronic device 10 may also include various audio input and output elements. For example, one or more an input receivers 18 may be located at the bottom of enclosure 12. The one or more input receivers 18 may include one or more microphones that receive user audio input such as a user's voice. Additionally, the electronic device may include one or more output transmitters 20. The output transmitters 20 may include one or more speakers for transmitting audio signals to a user. The one or more input receivers 18 and the one or more output transmitters 20 may be used in conjunction as audio elements of a telephone.

The display 22 may be a liquid crystal display (LCD) or may be a light emitting diode (LED) based display, an organic light emitting diode (OLED) based display, or other suitable display. The display 22 may be a touch sensitive display that allows the user to interact with a GUI 24 by touching the screen of the display 22 at a location corresponding to one of the icons 26 or some additional image. Additionally, the input structures 14 may work with the GUI 24 displayed on the display 22 to control functions of the device 10. For example, one of the user input structures 14 may be a wheel that allows a user to navigate a displayed GUI 24 and/or via a touch sensitive implementation of the display 22.

The GUI 24 may include a plurality of icons 26 as well as various images, such as logos, avatars, photos, album art, and so forth depending on which icon 26 is selected by the user. The icons 26 may represent various layers, windows, screens, templates, elements or other components that may be displayed in some or all of the areas of the display 22 upon selection by the user. Furthermore, selection of an icon 26 may lead to a hierarchical GUI 24 navigation process, such that a selection of an icon 26 leads to a sub-screen that includes one or more additional icons 26 or other GUI 24 elements. It should be appreciated that the GUI 24 may instead arrange other types of user interface elements in either hierarchical or non-hierarchical structures.

System indicators 28 may also be shown on the display 22 and may display various function and/or to provide feedback to a user. These system indicators 28 may include images corresponding to, for example, telephone signal strength, a network telephone provider, and internet signal strength of the device 10, the time of day, and the power status of the device 10. Furthermore, the system indicators 28 may change from screen to screen, they may remain in their initial locations on the display 22 as a user navigates through the GUI 24, or the system indicators 28 be removed as a user navigates through the GUI 24.

Figure 2:
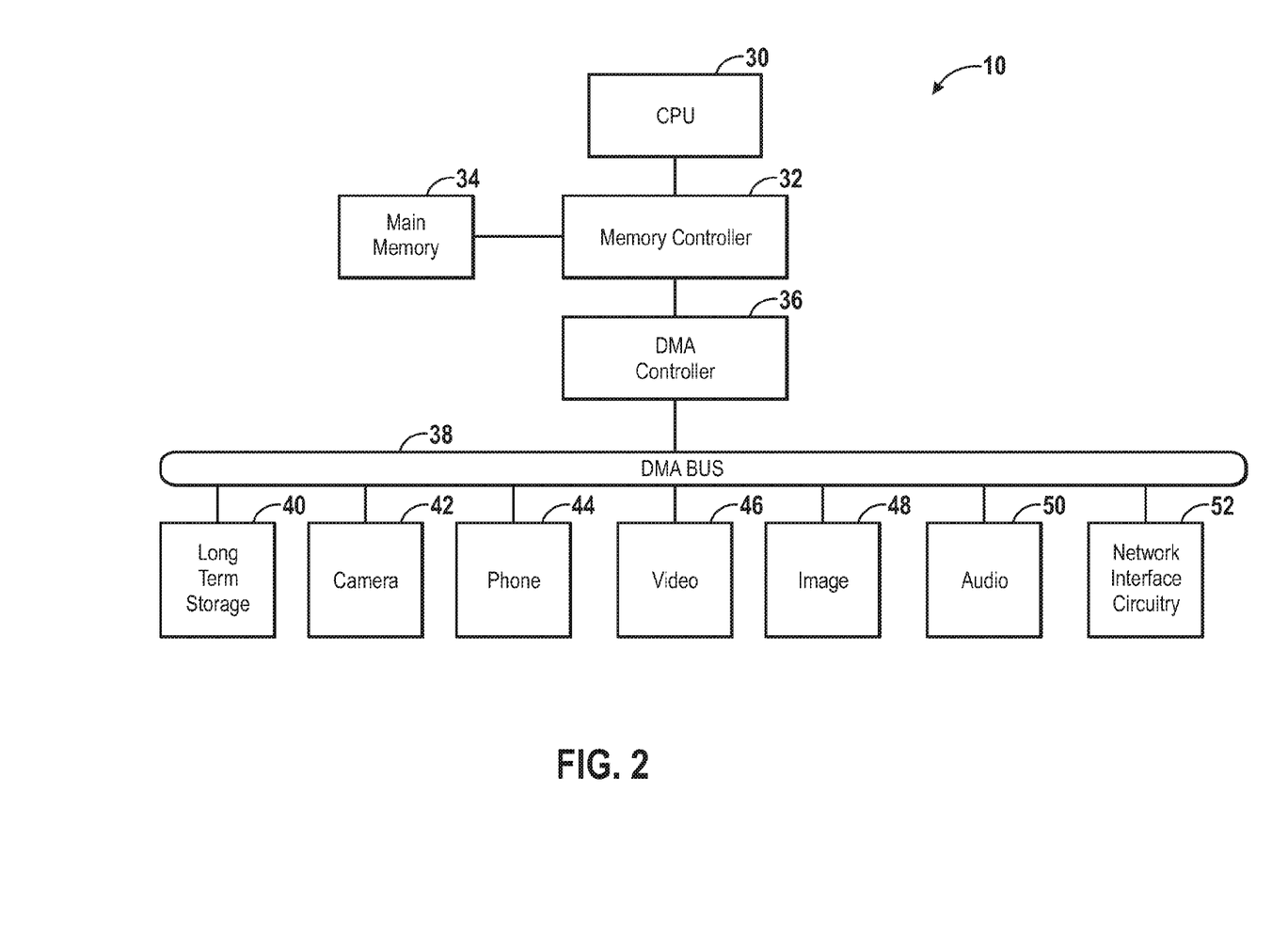
FIG. 2 is a block diagram of internal components of the electronic device of FIG. 1.

The operation of the electronic device 10 as described above is made possible through the interaction of circuitry internal to the electronic device 10. FIG. 2 is a block diagram that illustrates internal components that may be utilized by the electronic device 10 to operate. As discussed in greater detail below, the electronic device 10 may include a central processing unit (CPU) 30, a memory controller 32, a main memory 34, a DMA controller 36, and a DMA bus 38. Additionally, the electronic device may include a plurality of devices such as long term storage 40, camera circuitry 42, phone circuitry 44, video circuitry 46, imaging circuitry 48, audio circuitry 50, and network interface circuitry 52.

The CPU 30 may include a single processor or it may include a plurality of processors. For example, The CPU 30 may also include one or more "general-purpose" microprocessors, a combination of general and special purpose microprocessors, graphics processors, video processors, and/or related processor-like functions. The CPU 30 may provide the processing capability required to execute the operating system, programs, the GUI 24, and any other functions of the device 10. Furthermore, the CPU 30 may also include non-volatile memory, such as ROM, which may be used to store the firmware for the device 10, such as an operating system for the device 10 and/or any other programs or executable code used by the device 10 to function. The CPU 30 may also include internal memory for caching purposes.

A memory controller 32 may be implemented to transfer data to the CPU 30 from a main memory 34, which may be used as a temporary storage location for data which is to be rapidly accessed by the CPU 30. The memory controller 32 may regulate the flow of data and instructions between the main memory 34 and the CPU 30. The memory controller 32 may also regulate the transfer of data from the DMA controller 36 to the main memory 34 for subsequent access by the CPU. Alternatively, DMA controller 36 may regulate the transfer of data to the internal memory of CPU 30. Alternatively, the DMA controller 36 may be directly connected to the CPU 30, thus removing the memory controller 32 from the data path.

As noted above, the DMA controller 36 may be used for retrieving data to be operated on by the CPU 30 or for transferring data from one location to another. However, it is envisioned that the particular DMA controller 36 utilized may have other functions as described in the copending and commonly assigned U.S. patent application Ser. No. 12/060,178, filed Apr. 1, 2008, entitled, "Central DMA with Arbitrary Processing Functions," which is hereby incorporated by reference in its entirety for all purposes.

The DMA controller 36 may transfer data via a DMA bus 38. The DMA bus 38 provides a pathway to transmit data, command, and clock signals, as well as receive DMA request signals and receive data from target devices, which may be collectively referred to as "DMA transfer signals." The DMA controller 36 may include a plurality of DMA channels. Each DMA channel contains all of the state needed by the DMA controller 36 to manage a data transfer between the DMA controller 36 and a particular device via the DMA transfer signals in DMA bus 38 that connect the DMA controller to the device. These channels may be shared and simultaneously active, in effect, sharing the DMA bus 38. Alternatively, the channels may be individualized, that is, each channel directly corresponds to an individual device. Regardless of whether the channels are shared or individualized, the DMA controller 36 may operate as a control device for the transfer of data via the DMA bus 38 amongst one or more I/O devices and/or the main memory 34.

The I/O devices that may be connected to the DMA bus include long term storage 40, the camera circuitry 42, the phone circuitry 44, the video circuitry 46, the imaging circuitry 48, the audio circuitry 50, and the network interface circuitry 52. The long term storage 40 may be non-volatile memory such as flash memory, magnetic drives, optical drives, and/or read only memory circuitry. The camera circuitry 42 may allow a user to take digital photographs. The phone circuitry 44 may allow a user to receive or make a telephone call by interfacing between the input receiver 18 and the output transmitter 20 of FIG. 1 to complete a telephone call. The video circuitry 46 may be used to encode and decode video samples, either taken by the user in conjunction with the camera circuitry 42, and/or downloaded from an external source such as the internet. Similarly, the imaging circuitry 48 may allow for encoding and decoding of pictures taken by the user in conjunction with the camera circuitry 42, or downloaded from an external source such as the internet. The audio circuitry 50 may allow for the playing of audio files such as compressed music files.

The network interface circuitry 52 is an additional I/O device that is connected to the DMA controller 36 via the DMA bus 38. The network interface circuitry 52 may allow a user to communicate over a network, such as a LAN or WAN. In one embodiment, the network interface circuitry 52 may be a wireless interface device providing wireless connectivity using the IEEE 802.11 wireless networking protocol or any other suitable wireless networking protocol. The network interface circuitry 52 may also be an Ethernet interface device providing wired connectivity using the IEEE 802.3 Ethernet networking protocol. The network interface circuitry 52 may be used to connect the device 10 to a network for sending and/or receiving data with any other device on the network, such as other portable electronic devices, personal computers, printers, etc. For example, in one embodiment, the electronic device 10 may connect to a personal computer via the network interface circuitry 52 to send and receive data files, such as media files. The illustrated network interface circuitry 52 may not include network processing circuitry. Instead, the network processing circuitry may be integrated into the DMA controller 36, as will be discussed below.

Figure 3:
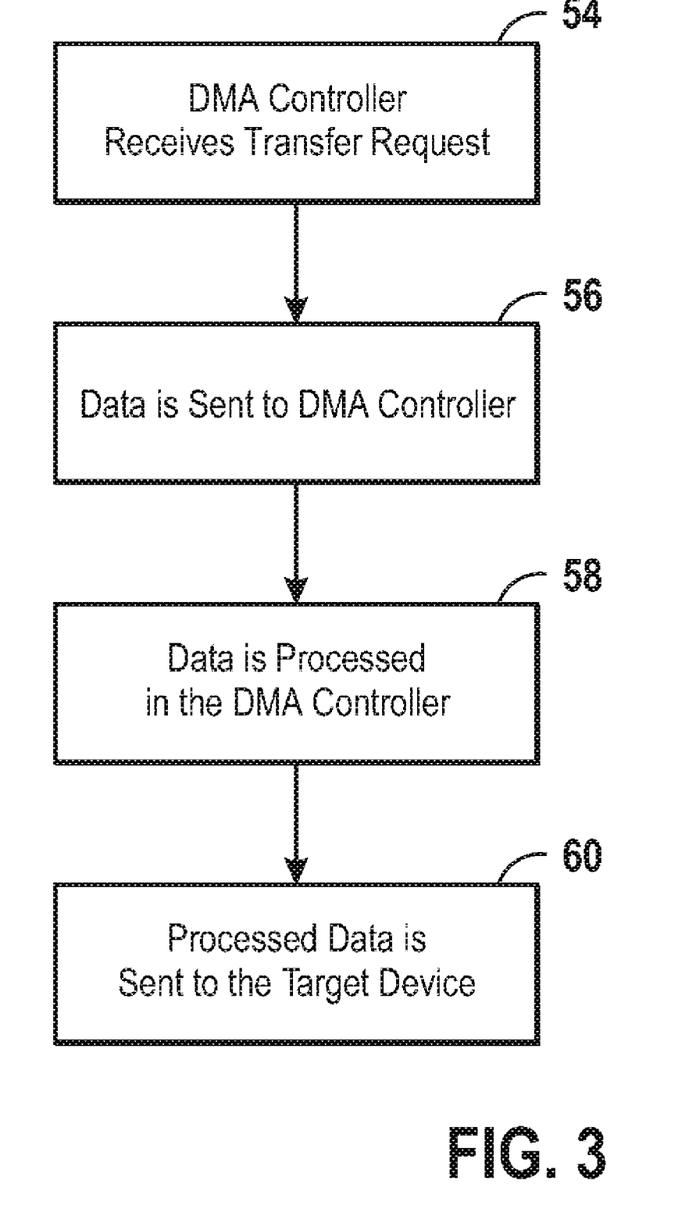
FIG. 3 is a flowchart depicting the operation of the portable media player of FIG. 1 while performing a DMA transfer.

The general process for receiving and processing a network packet utilizing DMA integrated network processing circuitry is depicted in FIG. 3. In step 54, the DMA controller 36 receives a data transfer request from the network interface circuitry 52. This data transfer request may be in response to the network interface circuitry 52 receiving data packets from a network interface. The DMA controller 36 may determine a destination for the data from network interface circuitry. The destination may be, for example, main memory 34. Alternatively, the destination may include a device attached to DMA bus 38. For example, the destination may be the long term storage 40. Additionally, there may be multiple destinations. For example, the destination for a portion of the data may be main memory 34, and the destination for the remaining portion of the data may be the imaging circuitry 48. The DMA controller 36 may activate a DMA channel clock along a channel in the DMA bus 38 corresponding to the network interface circuitry 52, as well as along a channel corresponding to the target device, here the long term storage 40, thus initiating a DMA transfer from the network interface circuitry 52 to the long term storage 40.

The network interface circuitry 52 receives the DMA channel clock from the DMA controller 36 to begin the process of transferring data to the DMA controller 36 in step 56. Additionally, the network interface circuitry 52 may receive command signals from the DMA controller 36. In response to the channel clock and the command signals, the network interface circuitry 52 may transmit a stream of received network data packets to the DMA controller 36 along channel of DMA bus 38. It should be noted that these network data packets have not been processed by the network interface circuitry 52 when transmitted to the DMA controller 36. The DMA controller 36 receives the transmitted network data packets to complete step 56.

As noted above, the network data packets are received by the DMA controller 36 without having been processed by the network interface circuitry 52. The processing of the data may instead be performed by an offload filter contained in the DMA controller 36. By handing off the processing of the network data packets to an offload filter, the network data packets may be processed simultaneously with the DMA transfer. Upon completion of the processing by the offload filter, the processed packets are transmitted to the target device, for example, the long term storage 40 along the DMA bus 38 in step 60.

Figure 4:
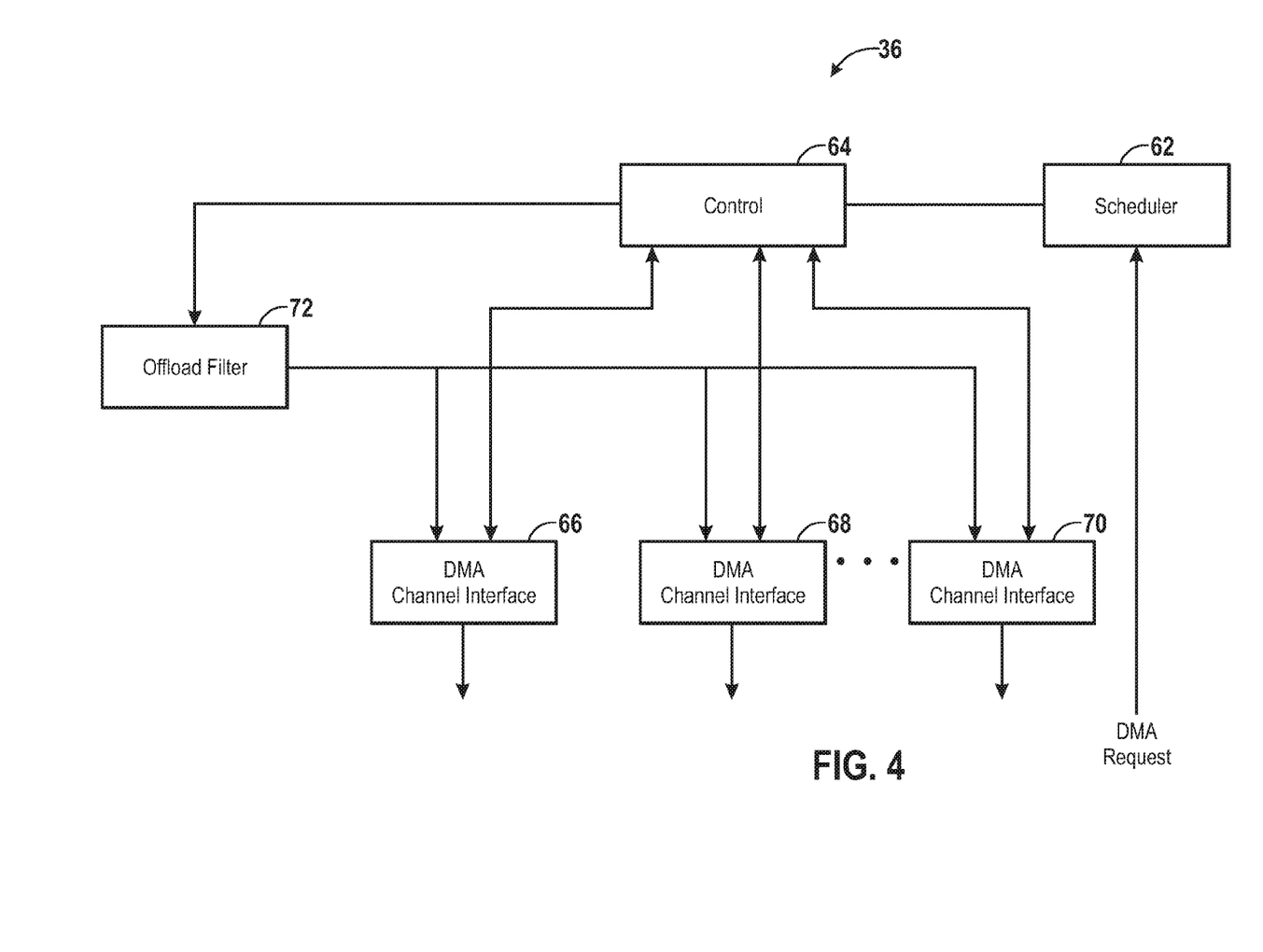
FIG. 4 is a simplified block diagram of the DMA controller of FIGS. 1 and 2.

To further explain the processing of a network packet by the DMA controller 36, a block diagram of DMA controller 36 is illustrated in FIG. 4. The DMA controller 36 includes a scheduler 62, control circuitry 64, a plurality of DMA channel interfaces 66, 68, and 70, and an offload filter 72. These elements may operate together to complete network packet and non-network packet DMA transfers, as will be set forth in a combined discussion of FIGS. 4 and 5 below.

Figure 5:
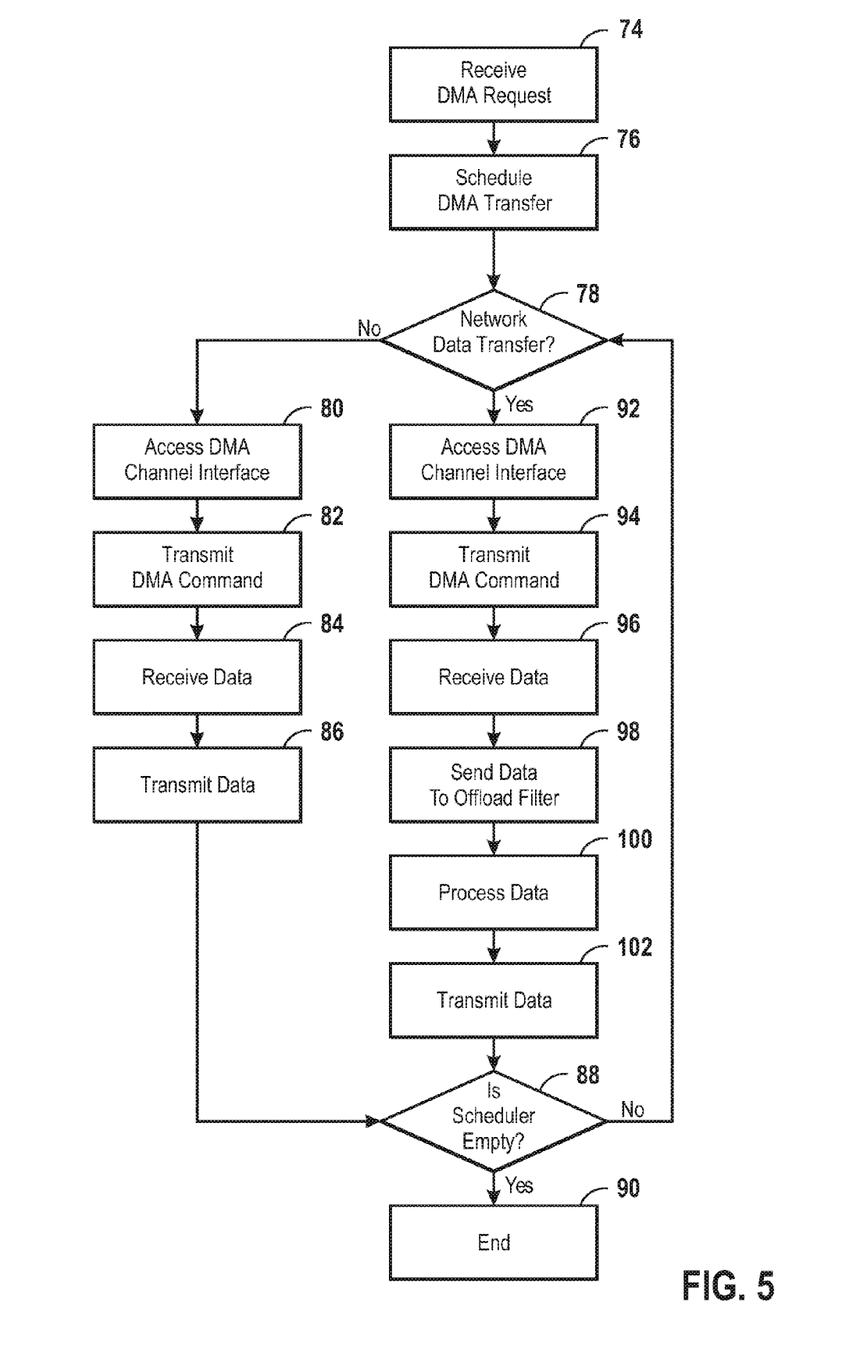
FIG. 5 is a flowchart depicting the operation of a DMA controller in accordance with the embodiment of FIG. 4.

In the operation of the DMA controller 36, the scheduler 62 may receive one or more DMA requests in step 74, and may determine which devices are requesting a DMA transfer. Once the scheduler 62 has received more than one DMA request, the scheduler 62 will schedule the DMA requests according to a schedule protocol at step 76. The scheduler 62, upon receiving more than one DMA request, may determine which DMA request should be processed first. This may be done using a first-in-first-out methodology whereby the DMA requests may be scheduled according to the order in which they are received by the scheduler 62. Alternatively, the scheduler 62 may determine which of a plurality of DMA requests should be given priority based upon a weighted value system, whereby each request may be assigned a priority ranking. A request with a high priority ranking may be scheduled before a request with a low priority ranking. In this manner, all of the DMA requests may be queued according to their respective priority ranking. The priority rankings may be pre-programmed based on relative importance of the DMA requests or may be dynamically based on factors such as number of requests already processed of a certain type or other factors. Additionally, the scheduler 62 may be programmed to interrupt any DMA transfer currently being processed when a DMA request with a certain priority is received by the scheduler 62. In this manner, DMA transfers that must occur in real time may be completed. Furthermore, the scheduler 62 may be programmed with an override function that allows a low priority request to be processed before a high priority request if, for example, the low priority request has been in the queue of the scheduler 62 for a certain period of time. This helps to insure that all requests will be processed regardless of priority. Once the DMA scheduler 62 has determined which of a plurality of DMA requests shall be given priority, the DMA request determined by the scheduler 62 to be processed is transmitted to the control circuitry 64.

The control circuitry 64 may receive the DMA request to be processed from the scheduler 62. The control circuitry 64 may be capable of, for example, initializing DMA transfers, managing the DMA channel interfaces 66, 68, and 70, and/or managing the DMA channel clocks. As DMA requests are received, the control circuitry 64 may determine specific DMA transfer characteristics and may configure one or more of the DMA interfaces 66-70 based on the characteristics of the DMA request, such as the amount of DMA bus 38 bandwidth allotted for a given DMA transfer. Additionally, the control circuitry 64 may analyze the DMA request to determine what type of processing (if any) is required prior to completing the DMA transfer. For example, in step the 76, the control circuitry determines if the DMA request forwarded by the scheduler 62 corresponds to a network or a non-network data transfer. The process for completing a DMA transfer of a non-network data transfer will be described below, followed by a description of a network data transfer.

To begin a non-network data transfer, the control circuitry 64 may determine that the DMA request has not issued from the network interface circuitry in step 78, i.e. the DMA transfer is a non-network data transfer. The control circuitry 64 may then proceed to step 80, whereby the control circuitry 64 may access one of the DMA channel interfaces 66-70.

The DMA channel interfaces 66-70 allow the DMA controller 36 to interface with the DMA bus 38 for DMA transfers between the DMA controller 36 and input/output devices such as long term storage 40. It should be noted that the DMA channel interfaces 66-70 may be statically linked to a particular physical DMA channel, or alternatively, the DMA channel interfaces 66-70 may by dynamically linked to any physical DMA channel. Regardless of how the DMA channel interfaces and the DMA channels are linked, the DMA channel interfaces 66-70 may receive a channel clock, used as a timing signal for the transfer of data between the DMA controller 36 and the I/O devices connected to DMA bus 38, as well as DMA command signals used to request and/or control data transfers between the I/O devices and the DMA controller 36. Thus, in step 80, when the DMA request is determined not to be a network data transfer, the control circuitry 64 may access a particular DMA channel interface 66 that is, for example, used for communication with the long term storage 40 as well as DMA channel interface 68 that is, for example, used for communication with audio circuitry 50. Additionally, channel clock signals may be transmitted along both DMA channel interface 66 and 68 during step 80, thus initializing the long term storage 40 and the audio circuitry 50 for a DMA transfer.

Step 82 continues the process of the DMA transfer by transmitting a DMA command along a DMA line to, for example, the long term storage 40 via DMA channel interface 66 as well as a command along a second DMA line associated with, for example, the audio circuitry 50 via DMA channel interface 68. In response to the received DMA command, the long term storage 40 may transmit requested data along the DMA bus 38 to the DMA channel interface 66. The DMA channel interface 66 may receive the data from long term storage 40 in step 84, and then inform control circuitry 64 that the data has been received. Control circuitry 64, having been informed that data has been received, may command DMA channel interface 68 to transmit data to the audio circuitry 50 in step 86. In this manner, a DMA transfer is completed between two I/O devices, namely the long term storage 40 and the audio circuitry 50.

Upon completion of the DMA transfer, the control circuitry 64 determines if the scheduler is empty in step 88, that is, whether there are any more DMA transfers to execute. If no further DMA transfers remain, the DMA transfer process terminates in step 90, concluding the non-network data transfer. If, however, the scheduler has remaining DMA requests, then the process begins anew at step 78.

A description of a DMA transfer that does include a network data transfer will now be described. As described above, the control circuitry 64 receives a DMA request and determines if it is a network data transfer in step 78. If the control circuitry 64 determines that the DMA request includes a network data transfer, then the control circuitry 64 in step 92, similar to step 80 discussed above, may access a particular DMA channel interface 70 that is, for example, used for communication with network interface circuitry 52.

Step 94 continues the process of the DMA transfer by transmitting a DMA command along a DMA line to, for example, the network interface circuitry 52 via DMA channel interface 70. In response to the received DMA command, the network interface circuitry 52 may transmit network packet data along the DMA bus 38 to the DMA channel interface 70. The DMA channel interface 70 may receive the data from network interface circuitry 52 in step 96, and then inform control circuitry 64 that the data has been received.

As discussed previously, the network packet data has not been processed by the network interface circuitry 52 before being transmitted to the DMA controller 36. Accordingly, the DMA controller 36 undertakes the processing of the network packet data, which may be accomplished by transmitting the network packet data to the offload filter 72 in step 98. This frees the control circuitry 64 to access the next transfer request from the scheduler 62 while the offload filter 72 performs the processing of the network packet data. If, for example, the next transfer request is not a network data packet DMA request, the control circuitry 64 may receive a DMA request from the scheduler 62 and execute a DMA transfer. Similarly, if the next DMA request is of a type to be sent to the offload filter 72, the scheduler 62 may choose a queued DMA request with a lower priority ranking to be transmitted to the control circuitry 64. Alternatively, the scheduler 62 may wait until the offload filter 72 has completed processing of the network packet data before transmitting another network data transfer request to the control circuitry 64.

The process for sending the data packets to the offload filter 72 in step 98 may include the control circuitry 64 interacting with the offload filter 72. This interaction may include activating the processing circuitry of the offload filter 72, setting the offload filter 72 to an encoding or decoding mode, as well as activating and deactivating the offload filter 72 as a power saving mechanism. That is, when no network data transfers are requested, the control circuitry 64 may deactivate the offload filter 72 by placing it into a sleep mode in which the filter consumes less power than it would consume in normal operation, thus conserving power in the electronic device 10. When the offload filter 72 is needed again, the control circuitry 64 may activate the offload filter 74 for network packet processing. Once activated, the offload filter 72 may receive packet data from the control circuitry 64 corresponding to data received at a channel interface 70.

The offload filter 74 may also be configured to process the transmitted data without first saving the transmitted data on an intermediate medium. In this manner, the offload filter 72 may be said to operate "on-the-fly", thus reducing the amount of buffering required for the offload filter since no on-chip memory buffers will be required to operate the offload filter 72 during the processing of the network packet data. In this manner, the offload filter 72 may process the network packet data in step 100, while the DMA controller 36 may be freed to perform additional DMA transfers simultaneously with the processing of the network data packets, leading to faster DMA transfers.

The processing of the network data packets in step 100 may include classification of the transferred data from the network interface circuitry 52. For example, if the packet was in a Transmission Control Protocol/Internet Protocol (TCP/IP) format, the processing may include removal of an IP header, and/or a TCP header. The headers and trailers may correspond to protocol information added to core network packet data transmitted to the network interface circuitry 52. However various types of transmission protocols include different headers and trailers. Accordingly, the processing performed by the offload filter 72 may include separating the transferred data from the network interface circuitry 52 into protocol information (e.g. headers and trailers) and core data, based on the classification of the type of transmitted data received by the offload filter 72. Additionally, the offload filter 72 may be utilized to add necessary protocol information to core network packet data in creating network data packets for transmission to the network interface circuitry 52, depending on the type of type of network transmission that is required by the network interface circuitry 52. Other types of processing in step 100 may include programmable hash-based packet classification, classifying and queuing of the packets, checksum generation and checking, and/or intelligent dropping of corrupt packets.

Once the offload filter 72 has completed the processing step 100, control circuitry 64 may transmit the processed network data packets, in step 102, to an appropriate location, for example, long term storage 40 or network interface circuitry 52 via an appropriate DMA channel interface 66 or 70, respectively. Upon successful transmission of the processed data packets in step 102, the control circuitry 64 determines if the scheduler is empty in step 88, that is, there are no more DMA transfers to execute. If the scheduler has remaining DMA requests, then the process begins anew at step 78. If, however, no further DMA transfers remain, the DMA transfer process terminates in step 90. The termination of the process in step 90 may include the control circuitry 64 sending deactivation signals to the offload filter 72, as well as deactivation of all control signals and channel clocks. Deactivation of these elements may be useful as a power saving technique for the electronic device 10.

Specific embodiments have been shown by way of example in the drawings and have been described in detail herein. However, it should be understood that the claims are not intended to be limited to the particular forms disclosed. Rather, the claims are to cover all modifications, equivalents, and alternatives falling within their spirit and scope.

The invention claimed is:

1. A direct memory access (DMA) controller, comprising:
 a control circuit adapted to receive device control information and to generate DMA transfer signals;
 an offload filter adapted to receive DMA transferred data and convert the DMA transferred data into processed data without the use of memory buffers in the DMA controller; and
 a plurality of DMA channel interface circuits adapted to receive the DMA transfer signals and the processed data.

2. The DMA controller of claim 1, wherein the offload filter is adapted to classify the DMA transferred data.

3. The DMA controller of claim 2, wherein the offload filter is adapted to separate the DMA transferred data into protocol information and core data based on the classification of the DMA transferred data.

4. The DMA controller of claim 2, wherein the offload filter is adapted to add protocol information as a header or as a trailer to core network packet data based on the classification of the DMA transferred data.

5. The DMA controller of claim 1, wherein the DMA transferred data is transmitted from a network interface circuit.

6. The DMA controller of claim 5, wherein the DMA transferred data is Transmission Control Protocol/Internet Protocol (TCP/IP) data.

7. The DMA controller of claim 1, wherein the offload filter is adapted to identify and drop corrupt packets from the transferred data.

8. A method, comprising:
 receiving device control information at a direct memory access (DMA) controller;

generating transfer signals in the DMA controller based on the received device control information;

receiving DMA transferred data in an offload filter of the DMA controller;

converting the transferred data into processed data in the offload filter of the DMA without the use of memory buffers in the DMA controller; and receiving the DMA transfer signals and the processed data at a plurality of DMA channel interface circuits in the DMA controller.

9. The method of claim 8, comprising classifying in the offload filter the DMA transferred data.

10. The method of claim 9, comprising separating the DMA transferred data into protocol information and core data in the offload filter based on the classification of the DMA transferred data.

11. The method of claim 9, comprising adding protocol information as a header or as a trailer to the core data in the offload filter based on the classification of the DMA transferred data.

12. The method of claim 8, wherein the received DMA transferred data is received from a network interface circuit.

13. The method of claim 12, wherein the DMA transferred data comprises Transmission Control Protocol/Internet Protocol (TCP/IP) data.

14. The method of claim 8, comprising identifying and dropping corrupt packets from the transferred data in the offload filter.

15. An electronic device, comprising:
a DMA controller adapted to receive a first DMA request and initiate a first DMA transfer based on the first DMA request, wherein the first DMA transfer comprises:
receiving data at the DMA controller;
converting the data into processed data in an offload filter in the DMA controller; and
transmitting the processed data, wherein the DMA controller is adapted to receive a second DMA request and initiate a second DMA transfer based on the second DMA request simultaneously with the conversion of the data into processed data in the offload filter.

16. The electronic device of claim 15, wherein converting the data into processed data comprises adding or removing information from a portion of the data.

17. The electronic device of claim 15, wherein the DMA controller comprises control circuitry adapted to execute a DMA transfer on a DMA request simultaneously with the conversion of the DMA transferred data into processed data.

18. The electronic device of claim 15, wherein the DMA controller comprises a scheduler adapted to prioritize the first DMA request and the second DMA request based on weighted values.

19. The electronic device of claim 15, wherein the scheduler is adapted to override the priorities of the first DMA request and the second DMA request based on the length of time that the first DMA request and the second DMA request have been in a queue in the scheduler.

* * * * *